United States Patent
Kino et al.

(10) Patent No.: US 10,326,342 B2
(45) Date of Patent: Jun. 18, 2019

(54) MANUFACTURING METHOD OF ROTOR

(71) Applicant: TOYOTA JIDOSHA KABUSHIKI KAISHA, Toyota-shi, Aichi-ken (JP)

(72) Inventors: Masahiro Kino, Ichinomiya (JP); Hiroaki Urano, Miyoshi (JP); Kenta Chimata, Miyoshi (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 181 days.

(21) Appl. No.: 15/227,511

(22) Filed: Aug. 3, 2016

(65) Prior Publication Data
US 2017/0040875 A1 Feb. 9, 2017

(30) Foreign Application Priority Data

Aug. 7, 2015 (JP) ................. 2015-157524

(51) Int. Cl.
*H02K 15/00* (2006.01)
*H02K 15/03* (2006.01)
*H02K 1/27* (2006.01)

(52) U.S. Cl.
CPC ........... *H02K 15/03* (2013.01); *H02K 1/2706* (2013.01); *H02K 1/276* (2013.01); *H02K 2213/03* (2013.01); *Y10T 29/49012* (2015.01)

(58) Field of Classification Search
CPC .... H02K 15/0018; H02K 15/02; H02K 15/03; H02K 1/276; H02K 1/27; H02K 1/2766; H02K 2201/00; H02K 1/2706; Y10T 29/49075; Y10T 29/49012; Y10T 29/49826; H01F 41/0253; H01F 41/005; H01F 1/00; H01F 3/00; F05B 2220/7068; F16C 2380/26; F16C 39/063
(Continued)

(56) References Cited

U.S. PATENT DOCUMENTS

| 7,608,966 B2 * | 10/2009 | Mizutani | H02K 1/276 |
| | | | 310/156.53 |
| 9,712,025 B2 * | 7/2017 | Hasegawa | H02K 1/276 |

(Continued)

FOREIGN PATENT DOCUMENTS

JP H09163649 A * 12/1995 ............... H02K 1/27
JP H09-163649 A 6/1997
(Continued)

OTHER PUBLICATIONS

Machine translation for JP 2014222964 A.*
(Continued)

*Primary Examiner* — Thiem D Phan
(74) *Attorney, Agent, or Firm* — Oliff PLC

(57) ABSTRACT

A manufacturing method for manufacturing a rotor such that a permanent magnet is inserted into a slot hole of a rotor core with a spacer includes: a step of placing, on the rotor core, a guide whose upper end has a curved guide surface such that the guide space continues with the slot hole in the up-down direction; a step of placing the spacer on the guide so that the spacer lies across the guide space; a step of inserting the permanent magnet into the guide space with the spacer being wound around the permanent magnet; and a step of inserting, into the slot hole, the permanent magnet around which the spacer is wound.

7 Claims, 19 Drawing Sheets

(58) Field of Classification Search
USPC ............ 310/156.01, 156.08, 156.36, 156.38, 310/156.53, 156.56, 156.57, 258, 261; 29/598, 596, 604, 607, 729, 732
See application file for complete search history.

(56) References Cited

U.S. PATENT DOCUMENTS

| | | | |
|---|---|---|---|
| 9,819,250 B2 * | 11/2017 | Hasegawa | ............... H02K 15/03 |
| 2016/0072370 A1 | 3/2016 | Hasegawa et al. | |
| 2016/0111944 A1 | 4/2016 | Ohshima et al. | |

FOREIGN PATENT DOCUMENTS

| | | | | |
|---|---|---|---|---|
| JP | 11355985 A | * | 12/1999 | |
| JP | H11355985 A | * | 12/1999 | ............... H02K 1/22 |
| JP | 2004-104966 A | | 4/2004 | |
| JP | 2007-060836 A | | 3/2007 | |
| JP | 2007060836 A | * | 3/2007 | |
| JP | 2009-077597 A | | 4/2009 | |
| JP | 2012-244677 A | | 12/2012 | |
| JP | 2014-222964 A | | 11/2014 | |
| JP | 2014222964 A | * | 11/2014 | |
| JP | 2015-035888 A | | 2/2015 | |
| JP | 2015-061487 A | | 3/2015 | |
| WO | 2014/167951 A1 | | 10/2014 | |
| WO | 2014/178246 A1 | | 11/2014 | |

OTHER PUBLICATIONS

Machine translation for JPH11355985A.*
Machine translation for JPH09163649A.*
JPH11355985A_Translated.*
JP2007060836A_Translated.*
JP2014222964A_Original.*

* cited by examiner

MANUFACTURING METHOD OF ROTOR

INCORPORATION BY REFERENCE

The disclosure of Japanese Patent Application No. 2015-157524 filed on Aug. 7, 2015 including the specification, drawings and abstract is incorporated herein by reference in its entirety.

BACKGROUND

1. Field

The present disclosure relates to a manufacturing method of a rotor.

2. Description of Related Art

Japanese Patent Application Publication No. 2014-222964 (JP 2014-222964 A) describes a manufacturing method for manufacturing a rotor core such that a permanent magnet is inserted into a magnet insertion hole of the rotor core, and then, resin is filled into the magnet insertion hole to fix the permanent magnet. More specifically, the permanent magnet is inserted into the magnet insertion hole with a band-shaped or string-shaped insertion member being wound therearound, so that the permanent magnet is fitted to the magnet insertion hole via the insertion member. Hereby, at the time of filling the resin, a position and a posture of the permanent magnet in the magnet insertion hole do not change, thereby resulting in that a good magnetic balance of the rotor core and a good balance in weight of the rotor core can be obtained.

However, the magnet insertion hole of the rotor core is formed by punching by press, so an opening edge of the magnet insertion hole in the rotor core is sharp. Accordingly, at a time when the permanent magnet is inserted into the magnet insertion hole with the insertion member being wound therearound, the insertion member might make contact with the opening edge so that the insertion member is damaged.

SUMMARY

The present disclosure provides a technique to prevent a spacer from being damaged at a time when a permanent magnet is inserted into a magnet insertion hole with the spacer being wound therearound.

An aspect of the present disclosure relates to a manufacturing method for manufacturing a rotor, comprising: a step of placing, on an iron core, a guide member having a pair of inner surface opposed to each other and a guide space extending in an up-down direction between the pair of inner surfaces, the guide member being placed on the iron core such that the guide space continues with a magnet insertion space in the up-down direction; a step of placing the spacer on the guide member such that the spacer lies across the guide space in a direction where the pair of inner surfaces are opposed to each other; a step of inserting a permanent magnet into the guide space with the spacer being wound around the permanent magnet; and a step of inserting the permanent magnet around which the spacer is wound into the magnet insertion space. The pair of inner surfaces of the guide member being each configured such that an end portion on an insertion side is formed as a curved surface. According to the above method, it is possible to insert the permanent magnet into the magnet insertion space with the spacer being wound therearound, while preventing the spacer from being damaged.

A curvature radius of the curved surface may be larger than a plate thickness of an electromagnetic steel sheet constituting the iron core. According to the above method, the end portions, on the insertion side, of the pair of inner surfaces of the guide member are formed to be larger than the plate thickness of the electromagnetic steel sheet constituting the iron core. Accordingly, a contact portion of the guide member with the spacer is formed in a gentle shape in comparison with an end portion of the magnet insertion space of the electromagnetic steel sheet, thereby making it possible to restrain the spacer from being damaged.

The guide member may be constituted by a first guide portion having one of the pair of inner surfaces, and a second guide portion having the other one of the pair of inner surfaces. In the step of inserting the permanent magnet into the guide space with the spacer being wound around the permanent magnet, the permanent magnet may be inserted into the guide space while the first guide portion and the second guide portion are pushed in a direction where the first guide portion and the second guide portion approach each other. According to the above method, it is possible to insert the permanent magnet into the guide space while the spacer is brought into close contact with the permanent magnet.

The spacer may be formed in a string shape, and the permanent magnet may have a housing groove in which to accommodate the string-shaped spacer. According to the above method, it is possible to prevent the string-shaped spacer from moving when the resin is filled.

The spacer may be formed in a sheet shape or a belt shape, and the manufacturing method may further include a step of applying an adhesive to the sheet-shaped or belt-shaped spacer before the permanent magnet is inserted into the guide space with the spacer being wound around the permanent magnet. Further, the manufacturing method may further include a step of filling resin into the magnet insertion space after the permanent magnet around which the spacer is wound is inserted into the magnet insertion space. According to the above method, it is possible to prevent the sheet-shaped or belt-shaped spacer from moving when the resin is filled.

The spacer may be made of synthetic resin, and the manufacturing method may further include a step of foaming the spacer after the permanent magnet around which the spacer is wound is inserted into the magnet insertion space. According to the above method, it is possible to omit the step of filling the resin into the magnet insertion space.

In the step of inserting the permanent magnet into the guide space with the spacer being wound around the permanent magnet, the spacer and the permanent magnet may be sandwiched in the up-down direction, and the permanent magnet may be inserted into the guide space with the spacer and the permanent magnet being sandwiched in the up-down direction. According to the above method, it is possible to prevent slipping between the spacer and the permanent magnet at a time when the spacer is wound therearound.

According to the present disclosure, it is possible to insert the permanent magnet into the magnet insertion space with the spacer being wound therearound, while preventing the spacer from being damaged.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS (First Embodiment) The first embodiment is described below with reference to FIGS. 1 to 12.

Figure 1:
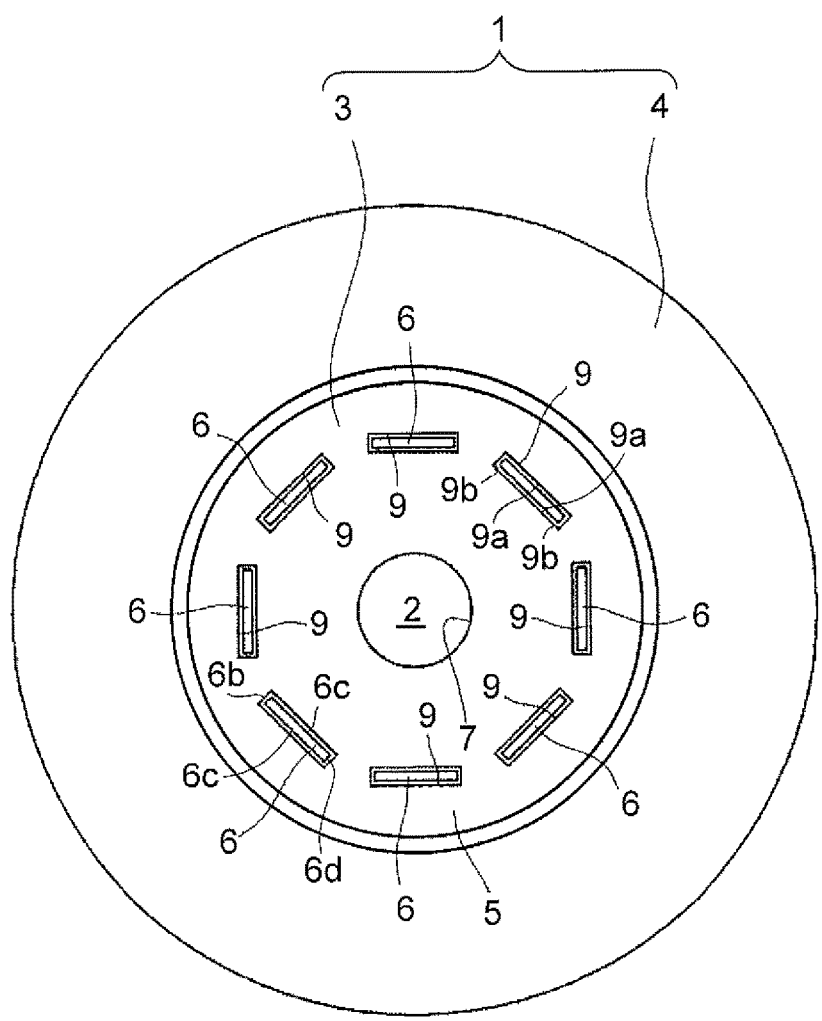
FIG. 1 is a plan view of a motor (First Embodiment)

As illustrated in FIG. 1, a motor 1 (an electric motor) includes a rotor 3 attached to an output shaft 2, and a stator 4 placed on an outer peripheral side relative to the rotor 3.

Figure 2:
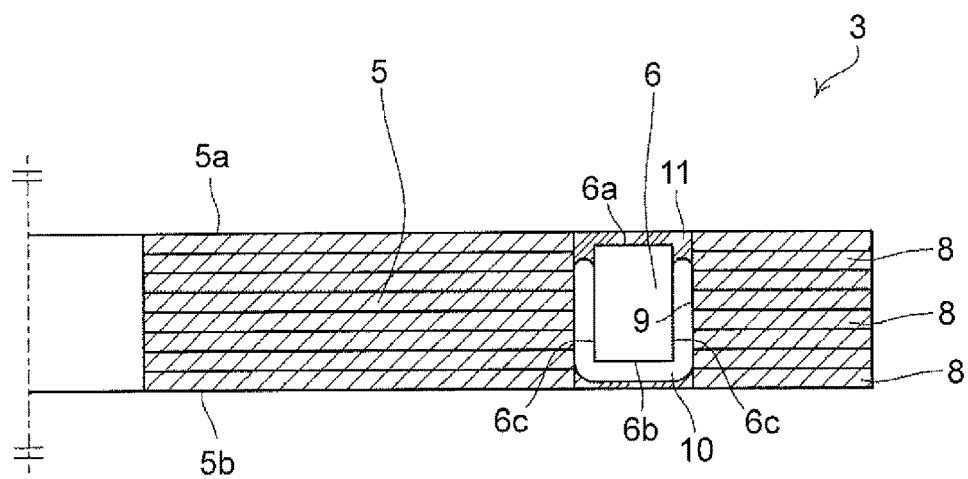
FIG. 2 is a sectional view of a rotor (First Embodiment)

As illustrated in FIGS. 1 and 2, the rotor 3 includes a rotor core 5 (iron core) and a plurality of permanent magnets 6.

As illustrated in FIG. 1, the rotor core 5 is formed in a toric shape in a plan view. An output-shaft attachment hole 7 to which the output shaft 2 is attached is formed in a center of the rotor core 5. As illustrated in FIG. 2, the rotor core 5 is configured such that a plurality of electromagnetic steel sheets 8 having a thickness of 200 to 500 micrometers is laminated in a rotation-axis direction of the rotor 3 (hereinafter just referred to as the rotation-axis direction), for example. As illustrated in FIG. 1, a plurality of slot holes 9 (magnet insertion spaces, magnet insertion holes) is formed in the rotor core 5. The plurality of slot holes 9 is arranged at regular intervals in a circumferential direction. The slot hole 9 is formed in a rectangular shape in a plan view. The slot hole 9 is sectioned by a pair of primary inner surfaces 9a (inner surfaces) and a pair of secondary inner surfaces 9b. The pair of primary inner surfaces 9a are opposed to each other in a radial direction of the rotor 3 (hereinafter just referred to as the radial direction). The pair of primary inner surfaces 9a are perpendicular to the radial direction. The pair of secondary inner surfaces 9b are opposed to each other in the circumferential direction. The pair of secondary inner surfaces 9b are perpendicular to the pair of primary inner surfaces 9a. The pair of secondary inner surfaces 9b are opposed to each other. The pair of primary inner surfaces 9a correspond to a pair of long sides of a rectangular shape, which is a shape of the slot hole 9 in a plan view. The pair of secondary inner surfaces 9b correspond to a pair of short sides of the rectangular shape, which is the shape of the slot hole 9 in a plan view. As illustrated in FIG. 2, the rotor core 5 has a top face 5a and a bottom face 5b. The slot hole 9 is formed so as to penetrate through the rotor core 5 in an up-down direction. The slot hole 9 is opened on the top face 5a and the bottom face 5b.

As illustrated in FIG. 1, a plurality of permanent magnets 6 is accommodated in a plurality of slot holes 9 of the rotor core 5, respectively. The permanent magnet 6 is formed in a rectangular solid shape in a plan view. As illustrated in FIGS. 1 and 2, the permanent magnet 6 has a top face 6a, a bottom face 6b, a pair of primary side surfaces 6c, and a pair of secondary side surfaces 6d. The pair of primary side surfaces 6c are perpendicular to the radial direction. The pair of secondary side surfaces 6d are perpendicular to the pair of primary side surfaces 6c. The pair of primary side surfaces 6c correspond to a pair of long sides of a rectangular shape, which is a shape of the permanent magnet 6 in a plan view. The pair of secondary side surfaces 6d correspond to a pair of short sides of the rectangular shape, which is the shape of the permanent magnet 6 in a plan view.

In a state where the permanent magnet 6 is accommodated in the slot hole 9, the pair of primary side surfaces 6c of the permanent magnet 6 is opposed to the pair of primary inner surfaces 9a of the slot hole 9, and the pair of secondary side surfaces 6d of the permanent magnet 6 is opposed to the pair of secondary inner surfaces 9b of the slot hole 9.

As illustrated in FIG. 2, a spacer 10 is wound around the permanent magnet 6. The spacer 10 is wound over one primary side surface 6c, the bottom face 6b, and the other primary side surface 6c of the permanent magnet 6. In the present embodiment, the spacer 10 has a sheet shape. The spacer 10 is formed of a material that can maintain its shape even if the spacer 10 is heated to 200 to 250 degrees Celsius, for example. The spacer 10 is formed of a synthetic resin sheet or paper having a heat resistance, for example.

The slot hole 9 is filled with resin 11. Since the slot hole 9 is filled with resin 11, the permanent magnet 6 is fixed to the rotor core 5. The spacer 10 is used to position the permanent magnet 6 with respect to the slot hole 9 when the resin 11 is filled into the slot hole 9.

Figure 3:
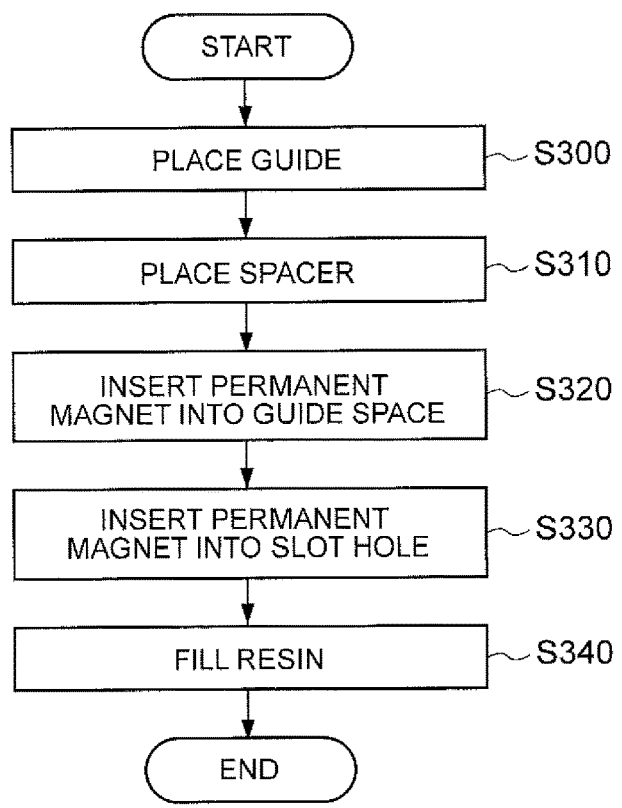
FIG. 3 is a flowchart of manufacturing the rotor (First Embodiment)
Figure 4:
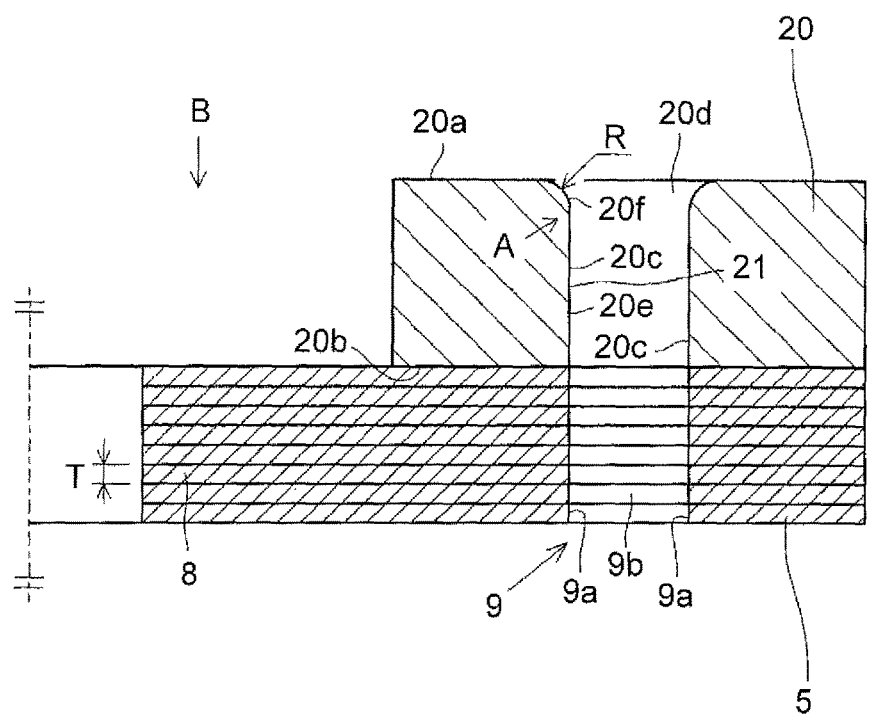
FIG. 4 is a sectional view illustrating a state where a guide is placed on a rotor core (First Embodiment)
Figure 5:
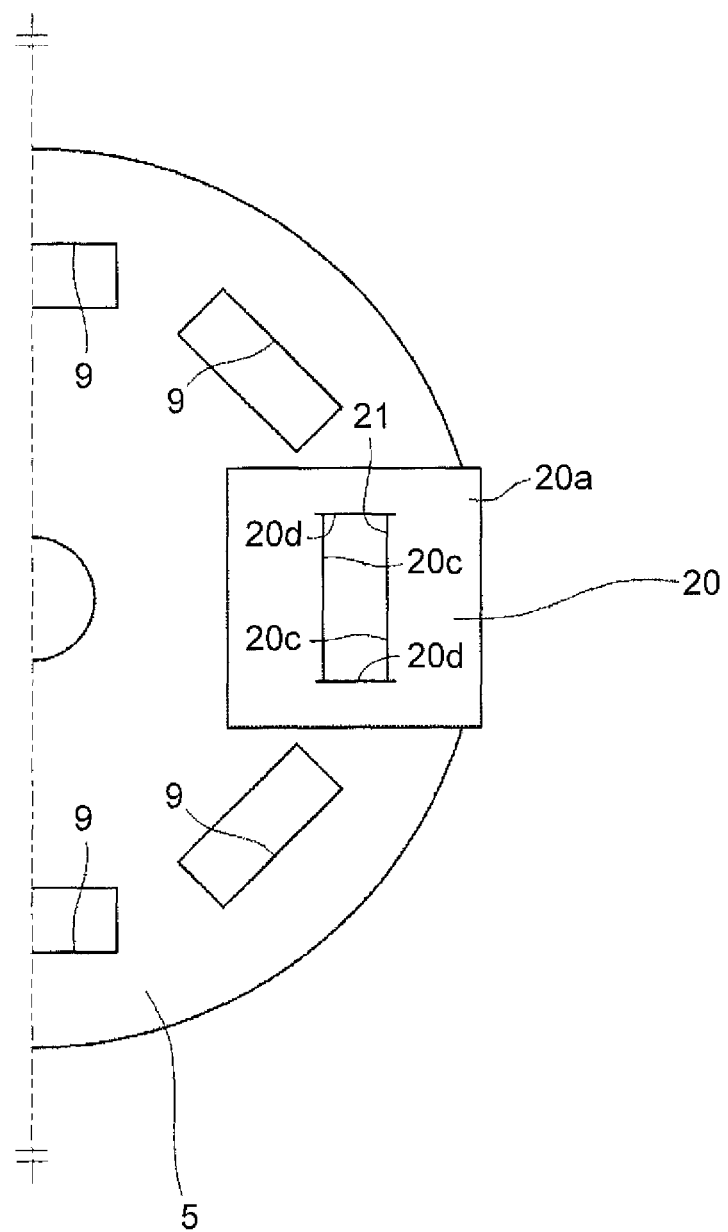
FIG. 5 is a plan view illustrating a state where the guide is placed on the rotor core (First Embodiment)

Referring now to FIGS. 3 to 12, a manufacturing method of the rotor 3 is described. FIG. 3 illustrates a flowchart of manufacturing the rotor 3. In the present embodiment, when the permanent magnet 6 is inserted into the slot hole 9 of the rotor core 5 with the spacer 10 being wound therearound, a guide 20 (a guide member) illustrated in FIGS. 4 and 5 is used.

That is, first, as illustrated in FIGS. 4 and 5, the guide 20 is placed on the rotor core 5 (S300). Here, the guide 20 is described in detail. As illustrated in FIGS. 4 and 5, the guide 20 has a guide space 21 extending in the up-down direction, and is formed in a solid shape as a whole. The guide 20 has a top face 20a, a bottom face 20b, a pair of primary guide surfaces 20c (inner surfaces), and a pair of secondary guide surfaces 20d. In a state where the guide 20 is placed on the rotor core 5, the pair of primary guide surfaces 20c are perpendicular to the radial direction. The pair of secondary guide surfaces 20d are perpendicular to the pair of primary guide surfaces 20c. The pair of primary guide surfaces 20c and the pair of secondary guide surfaces 20d section the guide space 21 extending in the up-down direction. That is, the guide space 21 extending in the up-down direction is formed between the pair of primary guide surfaces 20c. The guide space 21 extending in the up-down direction is formed between the pair of secondary guide surfaces 20d. The guide space 21 is formed so as to penetrate through the guide 20 in the up-down direction. In a state where the guide 20 is placed on the rotor core 5, the guide space 21 continues with the slot hole 9 in the up-down direction. More specifically, each of the pair of primary guide surfaces 20c and its corresponding one of the pair of primary inner surfaces 9a are placed generally on the same plane. Similarly, each of the pair of secondary guide surfaces 20d and its corresponding one of the pair of secondary inner surfaces 9b are placed generally on the same plane.

As illustrated in FIG. 4, the primary guide surface 20c has a straight guide surface 20e and a curved guide surface 20f (a curved surface). The straight guide surface 20e is a flat surface. The curved guide surface 20f is a curved surface. In the present embodiment, a curvature radius R of the curved guide surface 20f is set to be larger than a plate thickness T of the electromagnetic steel sheet 8 constituting the rotor core 5. The straight guide surface 20e and the curved guide surface 20f are smoothly continued in this order toward an upper side. The curved guide surface 20f smoothly continues with the top face 20a. The curved guide surface 20f is formed in an upper end A (an end portion) on an insertion side of the primary guide surface 20c. The curved guide surface 20f is formed in the upper end A, which is an end portion of the primary guide surface 20c on a farther side from the rotor core 5. The curved guide surface 20f is formed between the top face 20a and the straight guide surface 20e. The curved guide surface 20f curves so that the guide space 21 expands towards the upper side. That is, the curved guide surface 20f curves so that the guide space 21 is narrowed toward a lower side. The curved guide surface 20f curves so that the guide space 21 is narrowed toward an insertion direction B in which the permanent magnet 6 is inserted into the slot hole 9.

Figure 6:
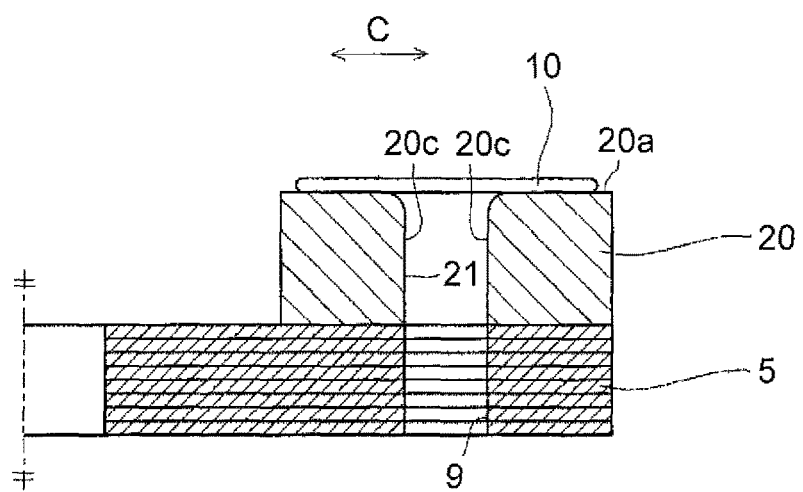
FIG. 6 is a sectional view illustrating a state where a spacer is placed on the guide (First Embodiment)
Figure 7:
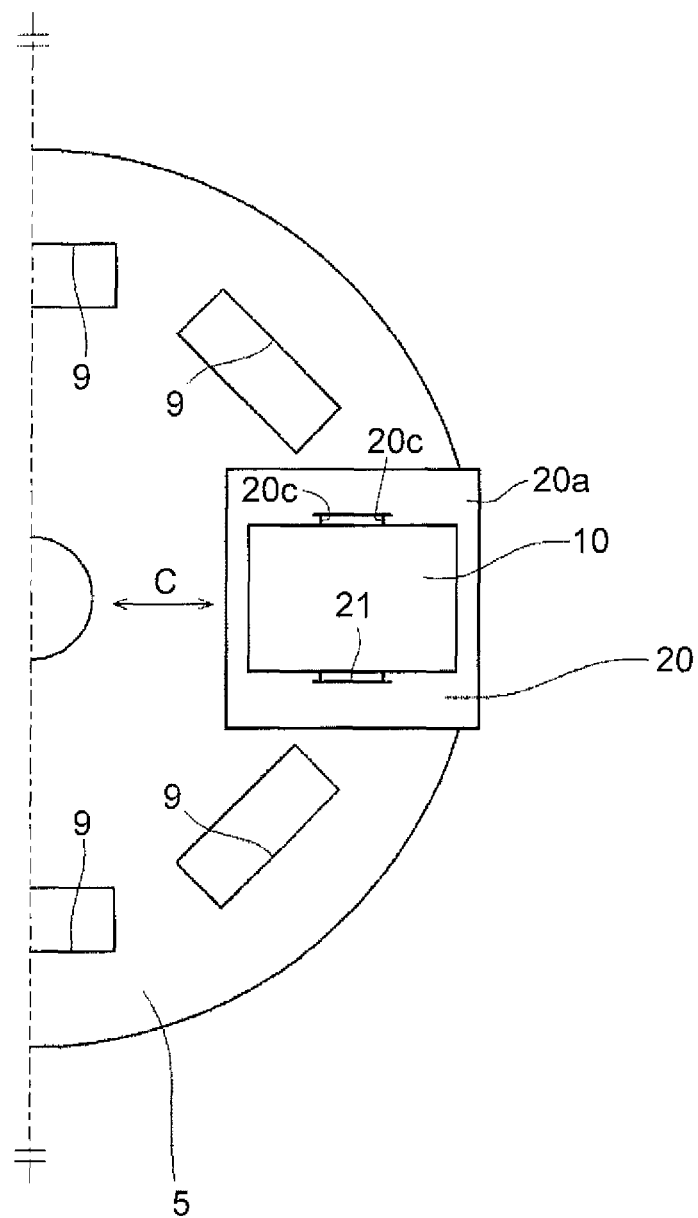
FIG. 7 is a plan view illustrating a state where the spacer is placed on the guide (First Embodiment)

Subsequently, as illustrated in FIGS. 6 and 7, the spacer 10 is placed on the top face 20a of the guide 20 so that the spacer 10 lies across the guide space 21 in a direction C where the pair of primary guide surfaces 20c are opposed to each other (S310).

Figure 8:
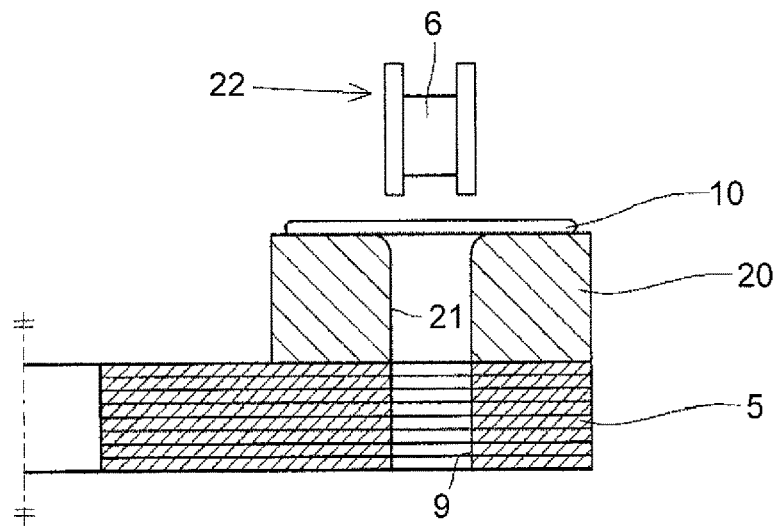
FIG. 8 is a sectional view illustrating a state before a permanent magnet and the spacer are sandwiched in an up-down direction (First Embodiment)

Then, as illustrated in FIGS. 8 to 11, the permanent magnet 6 is inserted into the guide space 21 with the spacer 10 being wound therearound (S320). More specifically, as illustrated in FIG. 8, the permanent magnet 6 clamped with a clamping device 22 is positioned above the spacer 10.

Figure 9:
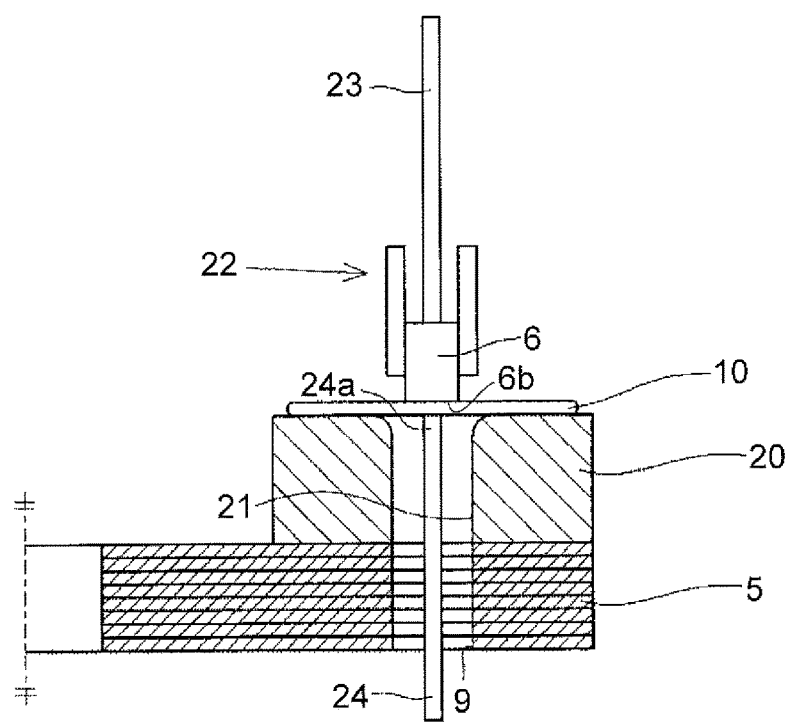
FIG. 9 is a sectional view illustrating a state after the permanent magnet and the spacer are sandwiched in the up-down direction (First Embodiment)

Subsequently, as illustrated in FIG. 9, the permanent magnet 6 is pushed down by a stick-shaped push-down jig 23 extending in the up-down direction, so that the bottom face 6b of the permanent magnet 6 is brought into contact with the spacer 10. At this time, clamping of the permanent magnet 6 by the clamping device 22 is slightly weakened. Further, a support jig 24 extending in the up-down direction is inserted into the slot hole 9 and the guide space 21 continuing in the up-down direction, so that an upper end 24a of the support jig 24 is brought into contact with the spacer 10. Then, the push-down jig 23 is further pushed down and the support jig 24 is further pushed up, so that the permanent magnet 6 and the spacer 10 are sandwiched by the push-down jig 23 and the support jig 24 in the up-down direction.

Figure 10:
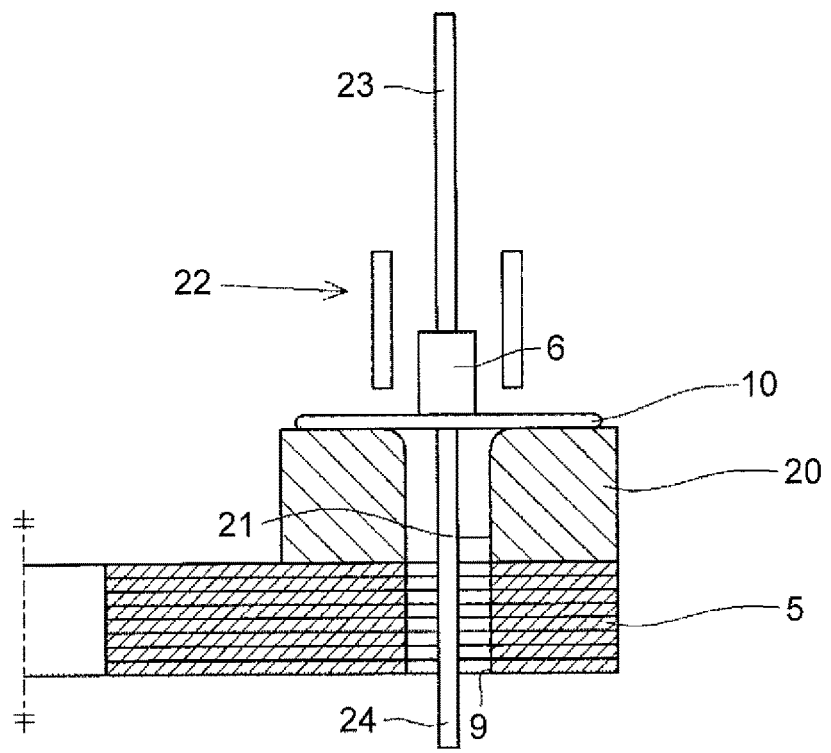
FIG. 10 is a sectional view illustrating a state where clamping is completely released from the permanent magnet (First Embodiment)

Subsequently, as illustrated in FIG. 10, the clamping of the permanent magnet 6 by the clamping device 22 is completely released.

Figure 11:
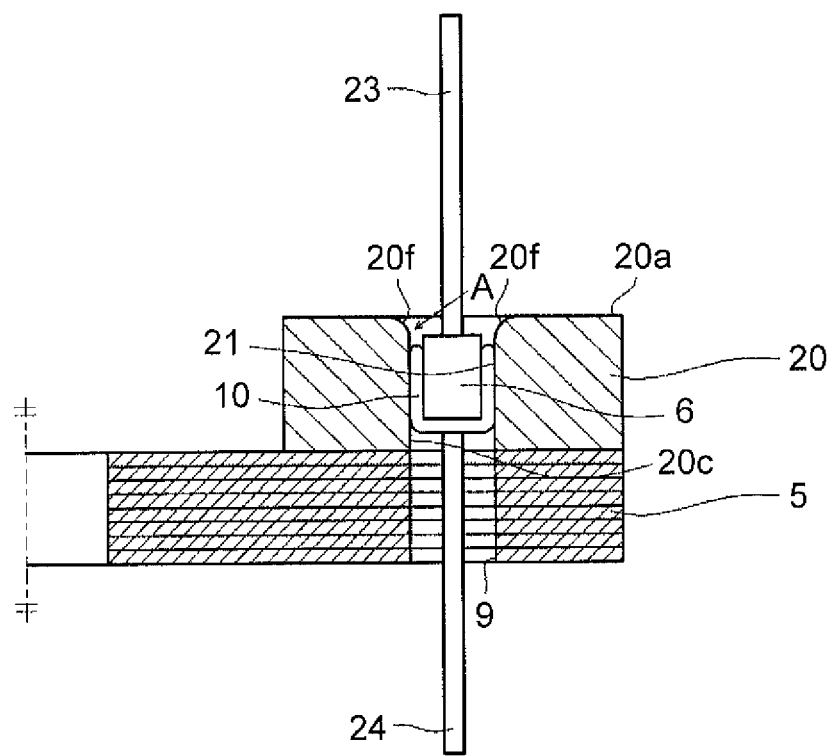
FIG. 11 is a sectional view illustrating a state where the permanent magnet is inserted into a guide space with the spacer being wound therearound (First Embodiment)

Then, as illustrated in FIG. 11, the permanent magnet 6 is inserted into the guide space 21 with the permanent magnet 6 and the spacer 10 being sandwiched by the push-down jig 23 and the support jig 24 in the up-down direction (S320). As a result, as the permanent magnet 6 is inserted into the guide space 21, the spacer 10 is drawn into the guide space 21, thereby resulting in that the spacer 10 is wound around the permanent magnet 6 inside the guide space 21. More specifically, the spacer 10 is wound around the permanent magnet 6 so as to cover one primary side surface 6c of the permanent magnet 6, the bottom face 6b thereof, and the other primary side surface 6c thereof inside the guide space 21 (also see FIG. 2). At this time, the spacer 10 is drawn into the guide space 21 of the guide 20 while sliding over the guide 20. However, since the curved guide surface 20f smoothly connected to the top face 20a is formed in the upper end A on the insertion side of each of the primary guide surfaces 20c, the spacer 10 is not damaged due to contact with the guide 20 at a time when the spacer 10 is drawn into the guide space 21.

Figure 12:
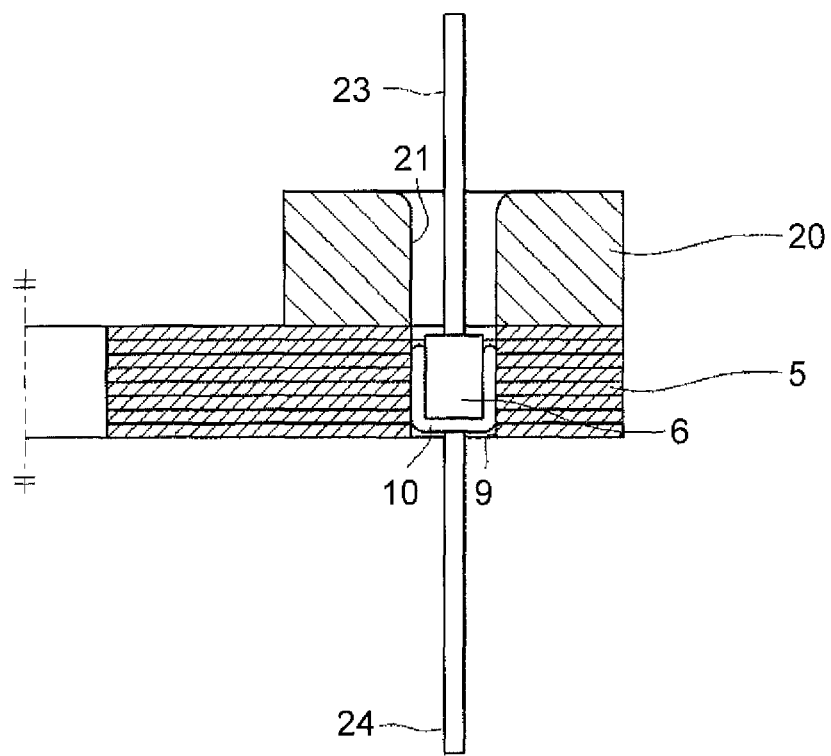
FIG. 12 is a sectional view illustrating a state where the permanent magnet around which the space is wound is inserted into a slot hole (First Embodiment)

Subsequently, as illustrated in FIG. 12, the permanent magnet 6 around which the spacer 10 is wound is inserted into the slot hole 9 with the permanent magnet 6 and the spacer 10 being sandwiched by the push-down jig 23 and the support jig 24 in the up-down direction (S330). After that, the push-down jig 23 is moved upward, and the support jig 24 is moved downward. In this state, the permanent magnet 6 is held by the rotor core 5 via the spacer 10 in the slot hole 9.

Finally, resin is filled into the slot hole 9 (S340).

The first embodiment has been described above, but the first embodiment has the following features.

The manufacturing method for manufacturing the rotor 3 such that the permanent magnet 6 is inserted into the slot hole 9 (the magnet insertion space) of the rotor core 5 (the iron core) with the spacer 10 being wound therearound includes: a step (S300) of placing, on the rotor core 5, the guide 20 (the guide member) having the pair of primary guide surfaces 20c (inner surfaces) opposed to each other and the guide space 21 formed so as to extend in the up-down direction between the pair of primary guide surfaces 20c, the guide 20 being placed on the rotor core 5 such that the guide space 21 continues with the slot hole 9 in the up-down direction; a step (S310) of placing the spacer 10 on the guide 20 so that the spacer 10 lies across the guide space 21 in the direction C where the pair of primary guide surfaces 20c are opposed to each other; a step (S320) of inserting the permanent magnet 6 into the guide space 21 with the spacer 10 being wound therearound; and a step (S330) of inserting, into the slot hole 9, the permanent magnet 6 around which the spacer 10 is wound. The curved guide surface 20f (the curved surface) is formed in the upper end A on the insertion side of each of the pair of primary guide surfaces 20c of the guide 20. According to the above method, it is possible to insert the permanent magnet 6 into the slot hole 9 with the spacer 10 being wound therearound, while preventing the spacer 10 from being damaged.

Further, the curvature radius R of the curved guide surface 20f is larger than the plate thickness T of the electromagnetic steel sheet 8 constituting the rotor core 5.

In the step (S320) of inserting the permanent magnet 6 into the guide space 21 with the spacer 10 being wound therearound, the spacer 10 and the permanent magnet 6 are sandwiched in the up-down direction, and the permanent magnet 6 is inserted into the guide space 21 with the spacer 10 and the permanent magnet 6 being sandwiched in the up-down direction. According to the above method, it is possible to prevent slipping between the spacer 10 and the permanent magnet 6 at a time when the spacer 10 is wound therearound.

The first embodiment has been described above, but the first embodiment can be modified as follows.

That is, in the first embodiment, as illustrated in FIGS. 5 to 7, the spacer 10 is placed on the guide 20 such that the spacer 10 lies across the guide space 21 in the direction C where the pair of primary guide surfaces 20c are opposed to each other. However, instead of this, the spacer 10 may be placed on the guide 20 such that the spacer 10 lies across the guide space 21 in a direction where the pair of secondary guide surfaces 20d are opposed to each other. In this case, a curved surface is formed in an upper end on an insertion side of each of the secondary guide surfaces 20d. This makes it possible to obtain the same effect as the first embodiment.

Further, in the first embodiment, as illustrated in FIGS. 10, 11, the permanent magnet 6 is inserted into the guide space 21 with the permanent magnet 6 and the spacer 10 being sandwiched by the push-down jig 23 and the support jig 24 in the up-down direction. However, the support jig 24 can be omitted.

Further, in the first embodiment, after the guide 20 is placed on the rotor core 5 (S300), the spacer 10 is placed on the guide 20 (S310). Instead of this, the guide 20 may be placed on the rotor core 5 after the spacer 10 is placed on the guide 20.

In the first embodiment, the manufacturing method is for manufacturing the rotor 3 such that the permanent magnet 6 is inserted into the slot hole 9 of the rotor core 5 with the spacer 10 being wound therearound, but the manufacturing method can be applied to the stator core (the iron core) of the stator 4.

(Second Embodiment) The second embodiment is described below with reference to FIGS. 13 to 17. The following mainly describes a different point of the present embodiment from the first embodiment, and redundant descriptions are omitted.

In the first embodiment, as illustrated in FIG. 5, for example, the guide 20 has an appearance of a rectangular solid shape, and is formed integrally. The guide 20 has the guide space 21 penetrating through the guide 20 in the up-down direction.

Figure 13:
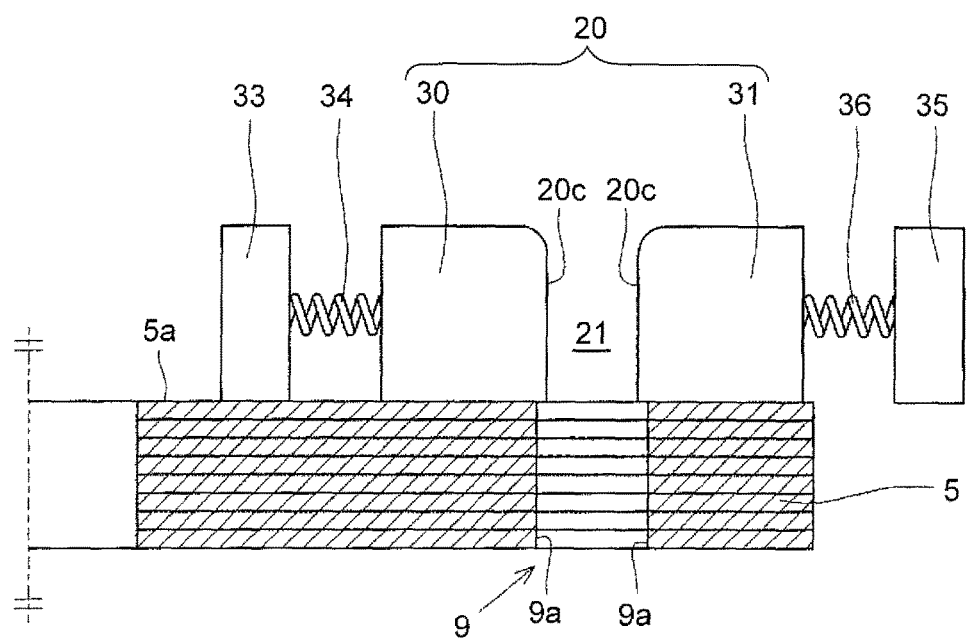
FIG. 13 is a sectional view illustrating a state where a guide is placed on a rotor core (Second Embodiment)
Figure 14:
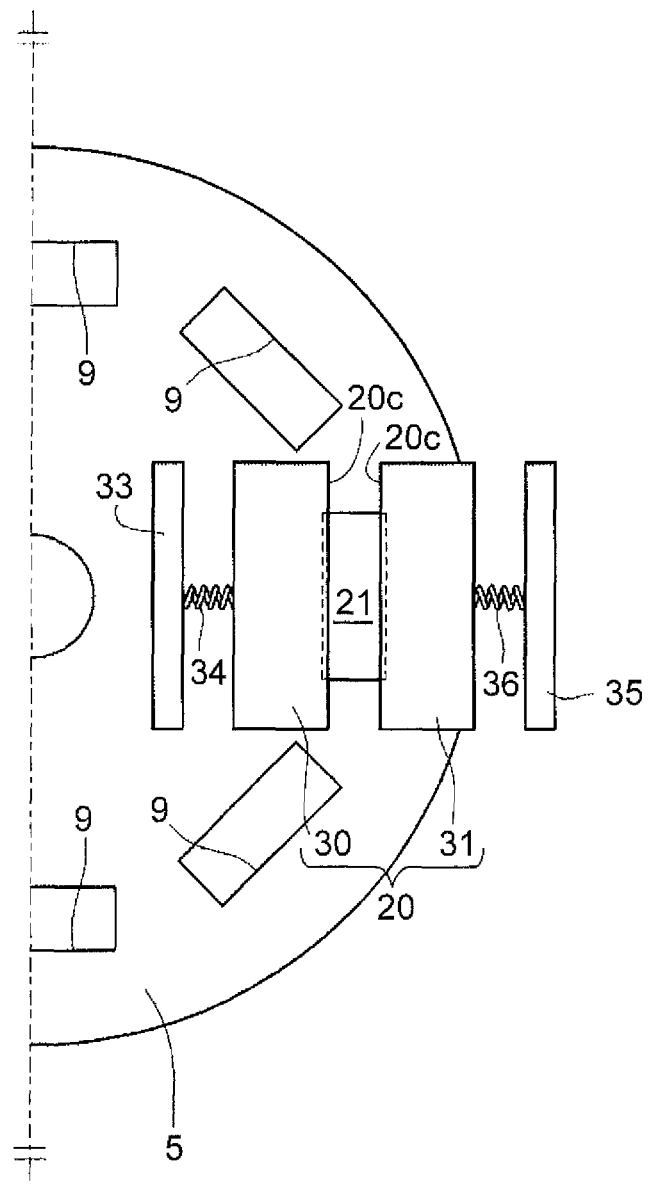
FIG. 14 is a plan view illustrating a state where the guide is placed on the rotor core (Second Embodiment)

In this regard, in the present embodiment, as illustrated in FIGS. 13, 14, a guide 20 is constituted by an inner guide 30 (a first guide portion) and an outer guide 31 (a second guide portion). The inner guide 30 and the outer guide 31 are opposed to each other in a radial direction. The inner guide 30 and the outer guide 31 are set slidably in the radial direction on a top face 5a of a rotor core 5. The inner guide 30 and the outer guide 31 can move relative to each other.

The inner guide 30 has a primary guide surface 20c on an inner peripheral side out of a pair of primary guide surfaces 20c. The outer guide 31 has a primary guide surface 20c on an outer peripheral side out of the pair of primary guide surfaces 20c. A guide space 21 extending in an up-down direction is formed between the primary guide surface 20c of the inner guide 30 and the primary guide surface 20c of the outer guide 31.

On an inner peripheral side relative to the inner guide 30, an inner block 33 positioned to be fixed to the rotor core 5, and a compression spring 34 placed between the inner guide 30 and the inner block 33 are provided. With this configuration, when the inner guide 30 is moved to the inner peripheral side, a force to return the inner guide 30 back to an outer peripheral side works on the inner guide 30 due to a spring restoring force of the compression spring 34.

Similarly, on the outer peripheral side relative to the outer guide 31, an outer block 35 positioned to be fixed to the rotor core 5, and a compression spring 36 placed between the outer guide 31 and the outer block 35 are provided. With this configuration, when the outer guide 31 is moved to the outer peripheral side, a force to return the outer guide 31 back to the inner peripheral side works on the outer guide 31 due to a spring restoring force of the compression spring 36.

As illustrated in FIG. 13, in a state where the compression spring 34 and the compression spring 36 stay at a natural length, a distance between the primary guide surface 20c of the inner guide 30 and the primary guide surface 20c of the outer guide 31 is smaller than a distance between a pair of primary inner surfaces 9a of a slot hole 9.

Figure 15:
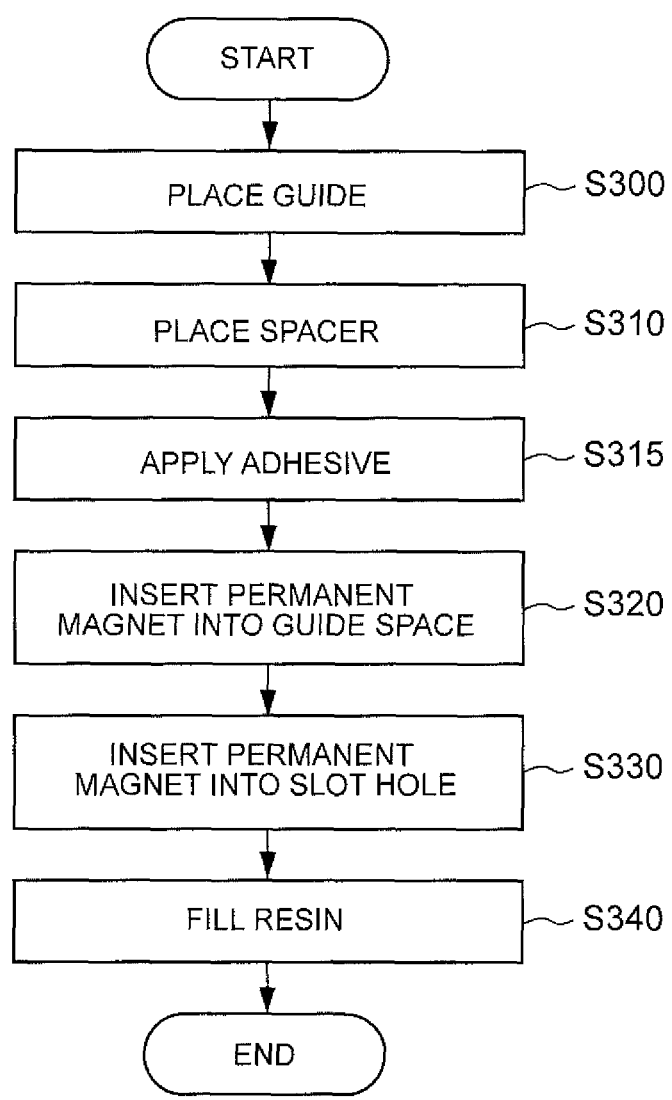
FIG. 15 is a flowchart of manufacturing a rotor (Second Embodiment)
Figure 16:
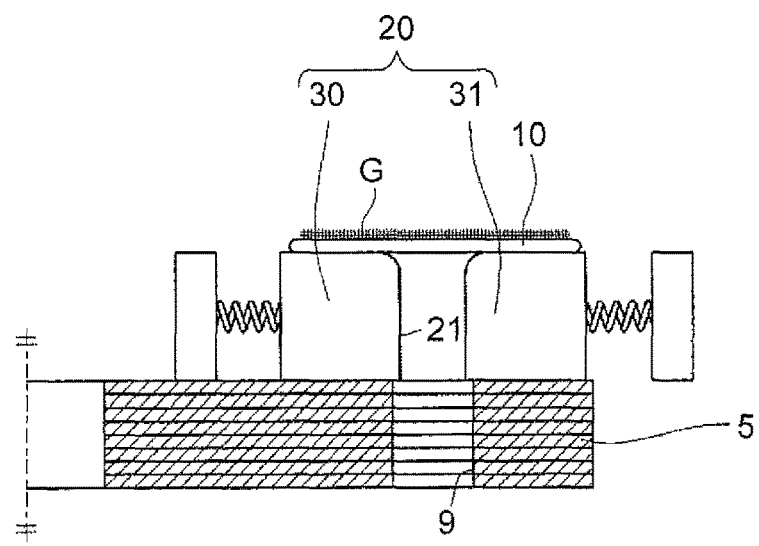
FIG. 16 is a sectional view illustrating a state where an adhesive is applied on a spacer (Second Embodiment)
Figure 17:
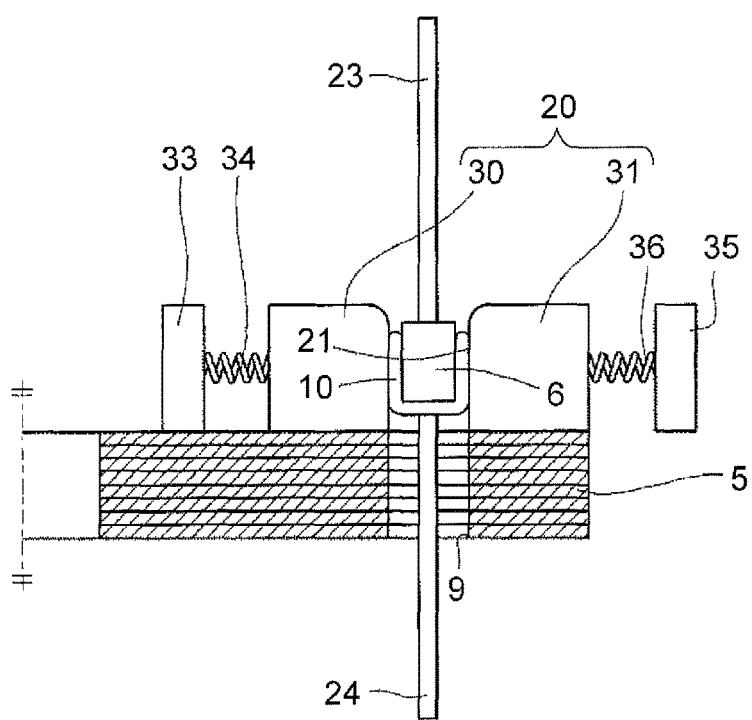
FIG. 17 is a sectional view illustrating a state where the permanent magnet is inserted into a guide space with the spacer being wound therearound (Second Embodiment)

Referring now to FIGS. 15 to 17, a manufacturing method of a rotor 3 is described. FIG. 15 illustrates a flowchart of manufacturing the rotor 3.

In the present embodiment, as illustrated in FIGS. 15, 16, a step (S315) of applying an adhesive G to a spacer 10 is added before a permanent magnet 6 is inserted into the guide space 21 with the spacer 10 being wound therearound (S320).

Further, as illustrated in FIG. 17, at a time when the permanent magnet 6 is inserted into the guide space 21 with the spacer 10 being wound therearound (S320), the permanent magnet 6 is inserted into the guide space 21 while the inner guide 30 and the outer guide 31 are pushed in a direction where they approach each other, by use of the inner block 33, the compression spring 34, the outer block 35, and the compression spring 36.

The second embodiment has been described above, but the second embodiment has the following features.

The guide 20 (a guide member) is constituted by the inner guide 30 (the first guide portion) having one of the pair of primary guide surfaces 20c (the inner surfaces), and the outer guide 31 (the second guide portion) having the other one thereof. In the step (S320) of inserting the permanent magnet 6 into the guide space 21 with the spacer 10 being wound therearound, the permanent magnet 6 is inserted into the guide space 21 while the inner guide 30 and the outer guide 31 are pushed in the direction where they approach each other. According to the above method, it is possible to insert the permanent magnet 6 into the guide space 21 while the spacer 10 is brought into close contact with the permanent magnet 6. Since the spacer 10 makes close contact with the permanent magnet 6, even if a gap between the primary side surface 6c of the permanent magnet 6 and the primary inner surface 9a of the slot hole 9 is small, it is possible to insert, into the slot hole 9, the permanent magnet 6 around which the spacer 10 is wound, without any problem.

Further, the spacer 10 has a sheet shape. The manufacturing method of the rotor 3 further includes the step (S315) of applying the adhesive G to the spacer 10 in a sheet shape before the permanent magnet 6 is inserted into the guide space 21 with the spacer 10 being wound therearound (S320), and a step (S340) of filling resin 11 into the slot hole 9 after the permanent magnet 6 around which the spacer 10 is wound is inserted into the slot hole 9 (the magnet insertion space). According to the above method, it is possible to prevent the sheet-shaped spacer 10 from moving when the resin 11 is filled.

Further, in the step (S320) of inserting the permanent magnet 6 into the guide space 21 with the spacer 10 being wound therearound, the permanent magnet 6 is inserted into the guide space 21 while the inner guide 30 and the outer guide 31 are pushed in the direction where they approach each other. This achieves a good adhesive property of the spacer 10 to the permanent magnet 6 due to the adhesive G.

The second embodiment has been described above, but the second embodiment can be modified as follows.

Figure 18:
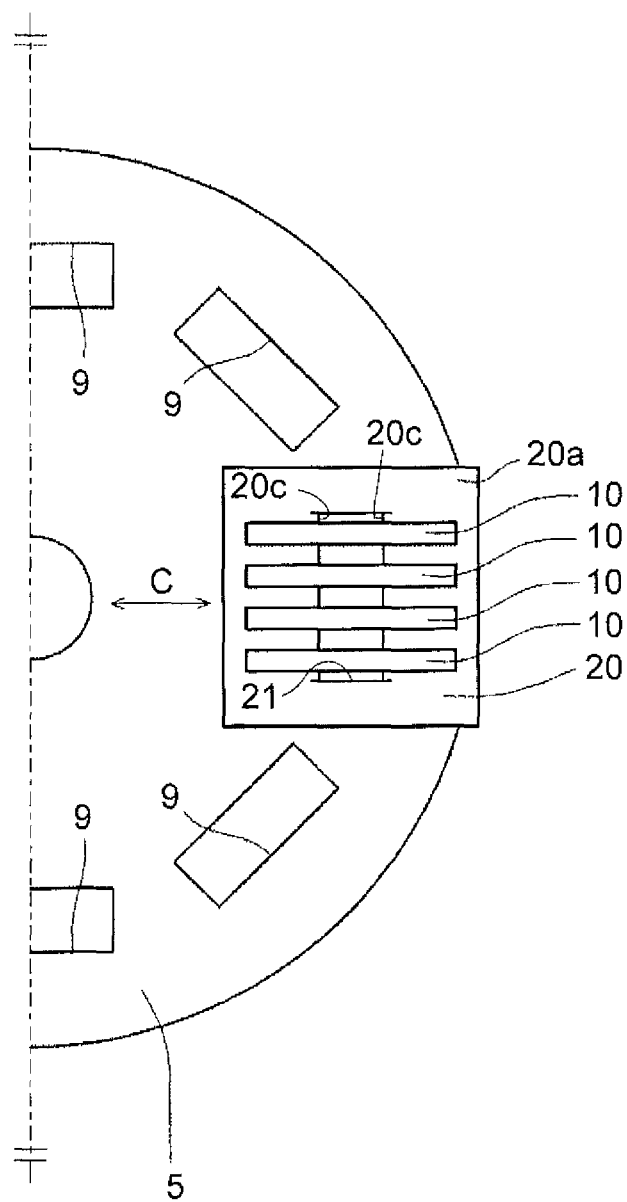
FIG. 18 is a plan view illustrating a state where a spacer is placed on a guide (Modification)

That is, in the second embodiment, the spacer 10 has a sheet shape. However, instead of this, the spacer 10 may be a belt shape as illustrated in FIG. 18. Further, in a case where the spacer 10 has a belt shape, it is possible to insert the permanent magnet 6 into the guide space 21 while a plurality of spacers 10 arranged at predetermined intervals is wound therearound at the same time, as illustrated in FIG. 18.

Further, in the second embodiment, after the spacer 10 is placed on the guide 20 (S310), the adhesive G is applied to the spacer 10 (S315). However, instead of this, the spacer 10 may be placed on the guide 20 after the adhesive G is applied to the spacer 10.

Figure 19:
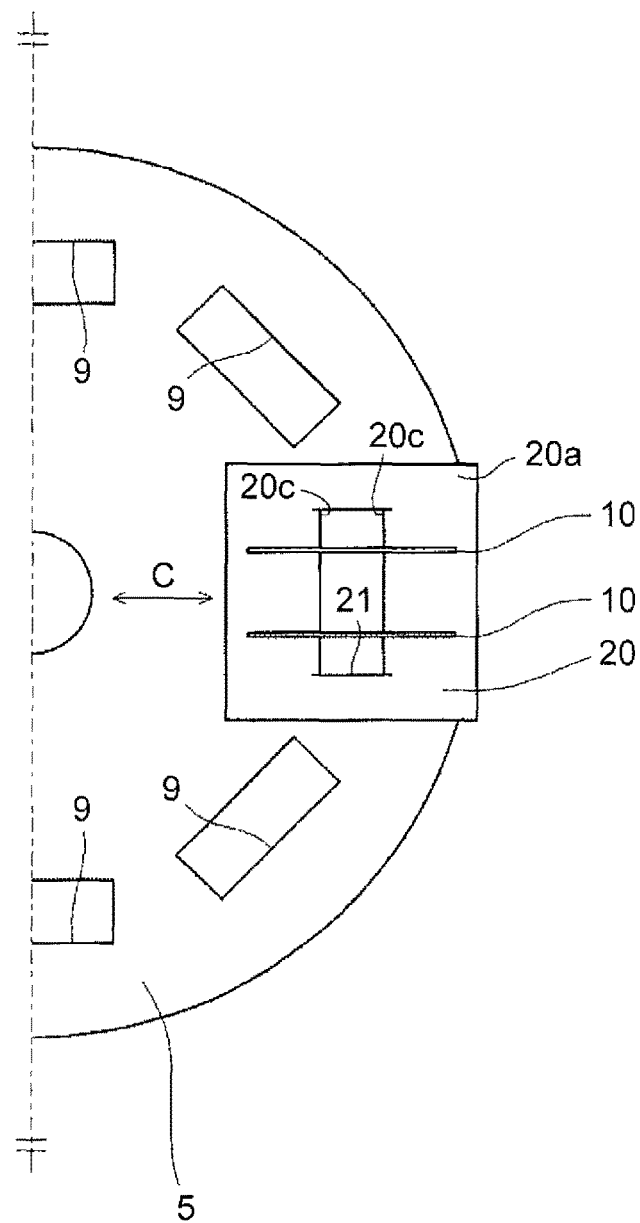
FIG. 19 is a plan view illustrating a state where a spacer is placed on a guide (Third Embodiment)

(Third Embodiment) The third embodiment is described below with reference to FIGS. 19 to 21. The following mainly describes a different point of the present embodiment from the first embodiment, and redundant descriptions are omitted.

For example, as illustrated in FIG. 7, the spacer 10 of the first embodiment has a sheet shape. However, instead of this, a spacer 10 of the present embodiment has a string shape as illustrated in FIG. 19. Further, a permanent magnet 6 is inserted into a guide space 21 while a plurality of string-shaped spacers 10 is wound therearound at the same time. In the present embodiment, two spacers 10 are used. A material of the string-shaped spacer 10 is preferably alumina fiber, glass fiber, and ceramic fiber, for example.

Figure 20:
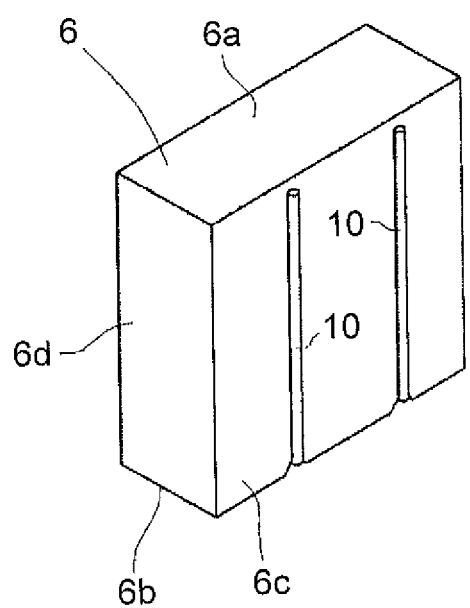
FIG. 20 is a perspective view of a permanent magnet around which a string-shaped spacer is wound (Third Embodiment)
Figure 21:
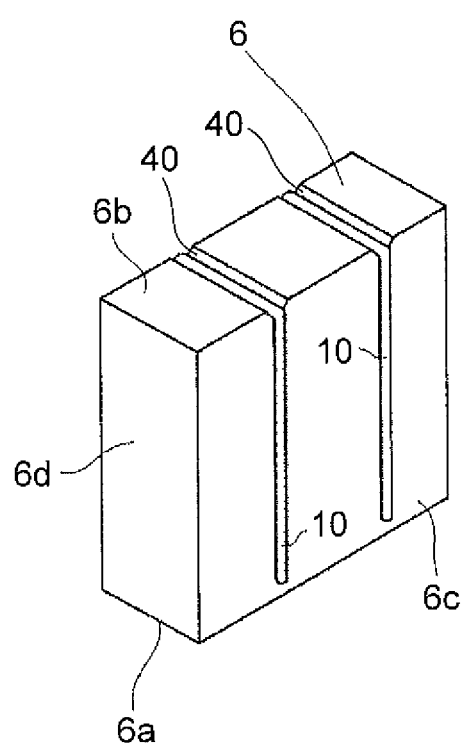
FIG. 21 is another perspective view of the permanent magnet around which the string-shaped spacer is wound (Third Embodiment)

FIGS. 20 and 21 illustrate a state where two string-shaped spacers 10 are wound around the permanent magnet 6 so as to lie across one primary side surface 6c, a bottom face 6b, and the other primary side surface 6c of the permanent magnet 6. As illustrated in FIG. 21, in the present embodiment, two housing grooves 40 in which to accommodate the two string-shaped spacers 10, respectively, are formed on the bottom face 6b of the permanent magnet 6. Each of the housing grooves 40 has a function to position a corresponding spacer 10.

The third embodiment has been described above, but the third embodiment has the following features.

A manufacturing method of a rotor 3 further includes a step (S340) of filling resin 11 into a slot hole 9 after the permanent magnet 6 around which the spacer 10 is wound is inserted into the slot hole 9 (the magnet insertion space). The spacer 10 has a string shape. The housing groove 40 in which to accommodate the string-shaped spacer 10 is formed in the permanent magnet 6. According to the above method, it is possible to prevent the string-shaped spacers 10 from moving due to flow of the resin 11 when the resin 11 is filled.

Further, the spacer 10 is completely accommodated in the housing groove 40 in the bottom face 6b of the permanent magnet 6. Accordingly, when the resin 11 is filled, the flow of the resin 11 on the bottom face 6b of the permanent magnet 6 is not obstructed by the spacer 10, thereby making it possible to reduce the number of necessary runners to be formed in a die for injection molding.

The third embodiment has been described above, but the third embodiment can be modified as follows.

In the third embodiment, the spacer 10 is completely accommodated in the housing groove 40 in the bottom face 6b of the permanent magnet 6. However, instead of this, the housing groove 40 may slightly accommodate the spacer 10. In other words, a depth of the housing groove 40 may be set to be deep so that the spacer 10 can be completely accommodated therein, or the depth of the housing groove 40 may be set to be shallow so that the spacer 10 can be partially accommodated therein.

Further, in the third embodiment, the permanent magnet 6 is inserted into the guide space 21 while two spacers 10 are wound therearound at the same time. However, instead of this, one spacer 10 or three or more spacers 10 may be used.

Figure 22:
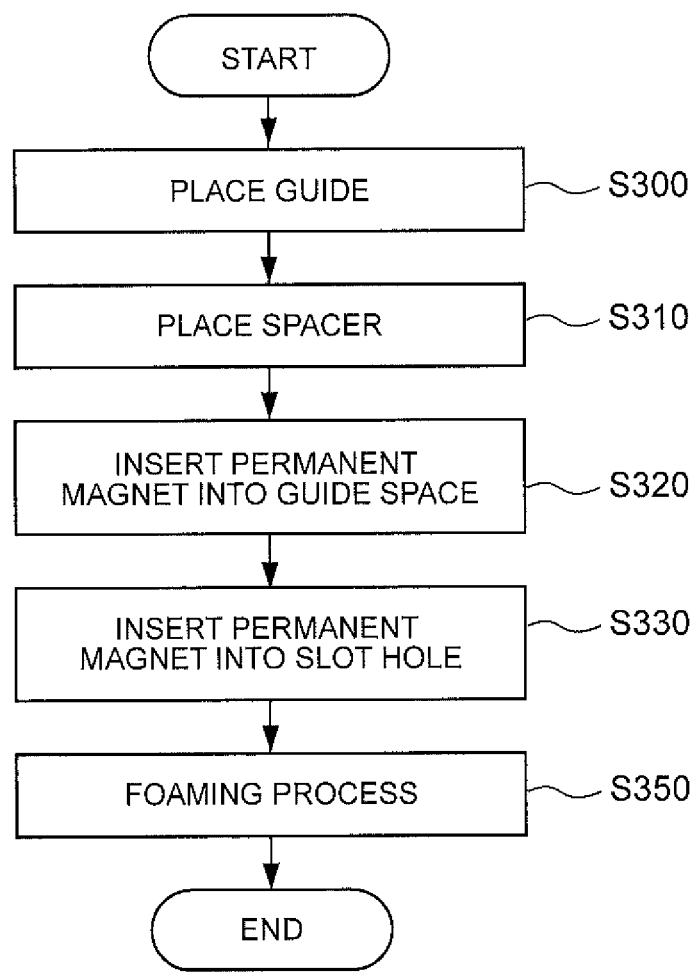
FIG. 22 is a flowchart of manufacturing a rotor (Fourth Embodiment).

(Fourth Embodiment) The fourth embodiment is described below with reference to FIG. 22. The following mainly describes a different point of the present embodiment from the first embodiment, and redundant descriptions are omitted.

For example, as illustrated in FIG. 7, the spacer 10 of the first embodiment has a sheet shape. More specifically, the spacer 10 is formed of a synthetic resin sheet or paper having a heat resistance, for example. However, instead of this, a spacer 10 of the present embodiment is formed of a synthetic resin sheet suitable for foaming, such as polyurethane (PUR), polystyrene (PS), and polyolefin (mainly polyethylene (PE) and polypropylene (PP)).

Further, in the first embodiment, as illustrated in FIG. 3, after the permanent magnet 6 is inserted into the slot hole 9 (S330), the slot hole 9 is filled with the resin 11 (S340). However, instead of this, in the present embodiment, after a permanent magnet 6 is inserted into a slot hole 9 (S330), the spacer 10 is foamed (S350), as illustrated in FIG. 22. As a method for foaming the spacer 10, well-known methods can be used such as a method using a chemical reaction (a chemical reaction gas utilization method), a method using a solvent having a low boiling point (a low-boiling solvent utilization method), and a method for mixing air (a mechanically mixing method).

The fourth embodiment has been described above, but the fourth embodiment has the following features.

The spacer 10 is made of synthetic resin. A manufacturing method of a rotor 3 further includes a step (S350) of foaming the spacer 10 after the permanent magnet 6 is inserted into the slot hole 9 (the magnet insertion space) with the spacer 10 being wound therearound (S330). According to the above method, it is possible to omit the step of filling the resin 11 into the slot hole 9.

Further, in the fourth embodiment, it is preferable that the spacer 10 be wound thoroughly around one primary side surface 6c, a bottom face 6b, and the other primary side surface 6c of the permanent magnet 6.

What is claimed is:

1. A manufacturing method for manufacturing a rotor, comprising:

a step of placing, on an iron core, a guide member having a pair of inner surface opposed to each other and a guide space extending in an up-down direction between the pair of inner surfaces, the guide member being placed on the iron core such that the guide space continues with a magnet insertion space in the up-down direction;

a step of placing a spacer on the guide member such that the spacer lies across the guide space in a direction where the pair of inner surfaces are opposed to each other;

a step of inserting a permanent magnet into the guide space with the spacer being wound around the permanent magnet; and a step of inserting the permanent magnet around which the spacer is wound into the magnet insertion space, the pair of inner surfaces of the guide member being each configured such that an end portion on an insertion side is formed as a curved surface, wherein:

a curvature radius of the curved surface is larger than a plate thickness of an electromagnetic steel sheet constituting the iron core;

the guide member is constituted by a first guide portion having one of the pair of inner surfaces, and a second guide portion having the other one of the pair of inner surfaces; and in the step of inserting the permanent magnet into the guide space with the spacer being wound around the permanent magnet, the permanent magnet is inserted into the guide space while the first guide portion and the second guide portion are pushed in a direction where the first guide portion and the second guide portion approach each other.

2. The manufacturing method according to claim 1, wherein:

the spacer is formed in a string-shape and the permanent magnet has a housing groove in which to accommodate the string-shaped spacer.

3. The manufacturing method according to claim 1, wherein the spacer is formed in a sheet shape or a belt shape, the manufacturing method further comprising:

a step of applying an adhesive to the sheet-shaped or belt-shaped spacer before the permanent magnet is inserted into the guide space with the spacer being wound around the permanent magnet.

4. The manufacturing method according to claim 1, further comprising:

a step of filling resin into the magnet insertion space after the permanent magnet around which the spacer is wound is inserted into the magnet insertion space.

5. The manufacturing method according to claim 1, wherein the spacer is made of synthetic resin, the manufacturing method further comprising:

a step of foaming the spacer after the permanent magnet around which the spacer is wound is inserted into the magnet insertion space.

6. The manufacturing method according to claim 1, wherein in the step of inserting the permanent magnet into the guide space with the spacer being wound around the permanent magnet, the spacer and the permanent magnet are sandwiched in the up-down direction, and the permanent magnet is inserted into the guide space with the spacer and the permanent magnet being sandwiched in the up-down direction.

7. The manufacturing method according to claim 1, wherein the first guide portion and the second guide portion are pushed, by using an elastic member, in the direction where the first guide portion and the second guide portion approach each other.

* * * * *